United States Patent
Fernando et al.

(10) Patent No.: US 7,383,455 B2
(45) Date of Patent: Jun. 3, 2008

(54) METHOD AND APPARATUS FOR TRANSFERRING MULTI-SOURCE/MULTI-SINK CONTROL SIGNALS USING A DIFFERENTIAL SIGNALING TECHNIQUE

(75) Inventors: John Susantha Fernando, Coopersburg, PA (US); Hyun Lee, Ladera Ranch, CA (US); Trevor Edward Little, Allentown, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 11/620,787

(22) Filed: Jan. 8, 2007

(65) Prior Publication Data

US 2007/0113116 A1 May 17, 2007

Related U.S. Application Data

(63) Continuation of application No. 09/788,582, filed on Feb. 16, 2001, now abandoned.

(51) Int. Cl.
*G06F 1/26* (2006.01)
(52) U.S. Cl. ..................................................... 713/300
(58) Field of Classification Search ................. 713/300
See application file for complete search history.

(56) References Cited

U.S. PATENT DOCUMENTS

| | | | | |
|---|---|---|---|---|
| 4,587,445 A | * | 5/1986 | Kanuma | 326/28 |
| 5,230,067 A | * | 7/1993 | Buch | 710/107 |
| 5,281,822 A | * | 1/1994 | Albrecht et al. | 250/370.05 |
| 5,539,590 A | * | 7/1996 | Tateishi | 360/69 |
| 5,978,578 A | * | 11/1999 | Azarya et al. | 717/100 |
| 6,037,827 A | * | 3/2000 | Fisch | 327/379 |
| 6,601,178 B1 | * | 7/2003 | Gulick | 713/322 |

* cited by examiner

*Primary Examiner*—Chun Cao
(74) *Attorney, Agent, or Firm*—Ryan, Mason & Lewis, LLP

(57) ABSTRACT

A method and apparatus are disclosed for transferring multi-source/multi-sink control signals using a differential signaling technique. An "active" state is transferred on a multi-source/multi-sink control signal network by inverting the previous voltage level, and an "inactive state" is transferred by maintaining the previous level. A change in the voltage level associated with a given control signal indicates that at least one node on an SoC device is asserting the corresponding control signal. In order to detect a change in the signal state from a previous cycle, each node includes a memory element, such as a latch, for maintaining the previous state. In this manner, a voltage level from the next interval can be compared to the recorded state to detect a change of state indicating an assertion of the control signal by another node. Thus, a given control signal is asserted whenever the state of the signal at the end of the previous cycle is different from the state of the signal at the end of the proceeding cycle. In one exemplary implementation, the asserted control signal is applied to an exclusive-OR gate together with the current value on the control signal wire to thereby cause a transition indicating an assertion of the control signal.

23 Claims, 4 Drawing Sheets

METHOD AND APPARATUS FOR TRANSFERRING MULTI-SOURCE/MULTI-SINK CONTROL SIGNALS USING A DIFFERENTIAL SIGNALING TECHNIQUE

CROSS-REFERENCE TO RELATED APPLICATIONS

The present application is a continuation application under 37 CFR §153(b) of U.S. application Ser. No. 09/788,582 filed Feb. 16, 2001 now abandoned and is related to U.S. patent application Ser. No. 09/785,604, entitled "Method and Apparatus for Distributing a Self-Synchronized Clock to Nodes on a Chip," U.S. patent application Ser. No. 09/785,602, entitled "Method and Apparatus for Distributing Multi-Source/Multi-Sink Control Signals Among Nodes on a Chip," U.S. patent application Ser. No. 09/785,653, entitled "Bidirectional Bus Repeater for Communications on a Chip," and U.S. patent application Ser. No. 09/785,592, entitled "On-Chip Method and Apparatus for Transmission of Multiple Bits Using Quantized Voltage Levels," each filed Jul. 16, 2001, assigned to the assignee of the present invention and incorporated by reference herein.

FIELD OF THE INVENTION

The present invention relates generally to communications on a single chip, and more particularly, to a signaling technique for multi-source/multi-sink control signals.

BACKGROUND OF THE INVENTION

Address and data busses provide data paths that are shared by a number of data processing devices, such as memory devices, micro-controllers, microprocessors, digital signal processors (DSPs) and peripheral devices. Busses are typically formed on printed circuit boards (PCBs) and interconnect the various devices mounted on the PCB The busses may also extend to connectors in order to allow external devices to be coupled to the bus.

Recently, integrated circuit (IC) manufacturers have begun producing single chips containing multiple device cores, such as multiple memory devices, micro-controllers, microprocessors and digital signal processors (DSPs), that were traditionally mounted on a PCB and interconnected by one or more busses on the PCB. Such a single chip is commonly referred to as a system-on-a-chip (SoC). SoCs incorporate one or more busses to provide data paths to interconnect the multiple core devices on the chip, often referred to as "nodes." The busses on SoCs, however, comprise conductor traces on the chip and thus tend to be much shorter in length and less sensitive to noise than PCB busses.

As SoCs grow in size and complexity, it becomes increasingly difficult to communicate control signals among the various nodes on the SoC, primarily due to the resistive-capacitive (RC) delays attributed to the conductor length Within each node on the SoC, increasing clock rates can be achieved using phase locked loop (PLL) or digital delay line (DDL) circuits (or both) It is also highly desirable to perform inter-node communications at the same internal clock rate used by each node. FIG. 1 is a schematic block diagram illustrating a conventional SoC 100 having a bus 110 that interconnects the various nodes 120-1 through 120-N (multiple core devices), collectively referred to as nodes 120, on the chip 100. As previously indicated, the nodes 120 may be embodied, for example, as memory devices, micro-controllers, microprocessors and digital signal processors (DSPs)

When an SoC 100 includes multiple nodes 120 communicating over a common bus 110, an Arbiter 150 is often used to determine which node 120 should actively drive the bus is 110 at a particular time Multi-source/multi-sink control signals, such as acknowledgement (ACK), data-valid, interrupt and error signals, are often employed to control communications on the SoC bus 110. All of the various nodes 120 and the Arbiter 150 typically operate synchronously with respect to a common clock 160, and ideally transfers on the bus would occur within one clock period.

When a given node 120 desires to communicate on the common bus 110, the node 120 sends a unidirectional request signal (REQn) to the Arbiter 150, and receives back a unidirectional grant signal (GNTn) from the Arbiter 150 that allows the node 120 to drive onto the bus wires in the next cycle. One condition for getting a GNTn signal is that the receiving node 120-R that is to receive the data has signaled to the Arbiter 150 that the receiving node 120-R is ready to accept data After the GNTn has been received, the transmitting node 120-T drives data onto the bus and looks for an ACK signal from the receiving node 120-R indicating that the initial data has been received and that more data can be sent The ACK signal is an example of a multi-source/multi-sink network.

Under control of the Arbiter 150, one of the nodes 120 will drive the ACK signal and another node 120 will monitor the ACK signal. The ACK signal transmits information from any node 120 to any other node 120 over an ACK network in one clock period. The ACK signal must also return to an inactive state when no nodes 120 are using the bus. The implementation of the ACK network (and the distribution network for other multi-source/multi-sink control signals) is technically challenging because the RC component of the interconnect 330 results in signal propagation delays of the same order as the desired clock period.

A number of techniques have been proposed or suggested for distributing multi-source/multi-sink control signals among various nodes 120 on a chip 100. Such multi-sourced networks are defined to be wired-OR or wired-AND circuits, and are commonly implemented with common-source or common-drain drivers using CMOS technology. A typical example is the interrupt signal (INT) of a microprocessor chip on a PCB sourced by several other chips. On the PCB, a single resistor pulls the INT network to the power supply voltage ($V_{DD}$) when all drivers are inactive. A driver may pull the INT signal towards $V_{ss}$ by turning on a transistor connected in the common-source mode. In the PCB environment, all drivers act independently and there is only one device monitoring the state of the INT network, but it is easily extended to an SoC example In the SoC environment of the present invention, the wired-OR technique discussed above may be attempted with a passive resistor or an active transistor. FIG. 2A illustrates a passive resistor implementation, where a pull-up resistor 215 may be located off of the SoC 210 (since high tolerance resistors are difficult to build on-chip) and connected to the wired-OR network 220 through a bond pad 225 Alternatively, the resistor could be implemented as either a strong always-on transistor and/or an active clamp transistor FIGS. 2B and 2C illustrate active transistor implementations, where transistors 260, 280 may be located on of the SoC 250, 270 itself and connected to the wired-OR network 255, 275. For active transistor implementations, the strength of the pull-up device 260, 280 must be matched to the load and configuration of the wired-OR network 255, 275 such that the signal may be pulled down to $V_{ss}$ and restored to $V_{DD}$ in one clock period. A wired-AND solution would use complementary devices and supplies similar to those shown in FIGS. 2A-2C.

Generally, each control signal must be brought to a known state before a given device can drive the signal. In the implementation of FIGS. 2A through 2C, the pull-up devices 215, 260, 280 will return the signal state to a known, inactive state when no individual node 120 is driving the signal. Thereafter, an individual receiving node 120-R desiring to send an ACK signal must bring the ACK control line high to acknowledge receipt of data, and once the transmitting node 120-T receives the ACK signal, the receiving node 120-R must return the ACK line to a low state. However, such arrangements are not power inefficient, and it is challenging for a single node 120 on an SoC 210, 250, 270 to pull down the signal against the pull-up devices 215, 260, 280. In addition, the strength of the pull-up devices 215, 260, 280 in such implementations must be adjusted for process variations and operating conditions. Furthermore, the wired-OR and wired-AND techniques exhibit static power dissipation whenever the multi-source/multi-sink control signal is asserted. Finally, segments of the wired-OR network closest to the pull-up device will not be pulled to zero, reducing noise margins, particularly for low voltage operation.

A need therefore exists for improved techniques for distributing multi-source/multi-sink control signals. A further need exists for a signaling approach that increases the information transfer rate. Yet another need exists for a control signal distribution network that provides improved scalability.

SUMMARY OF THE INVENTION

Generally, a method and apparatus are disclosed for transferring multi-source/multi-sink control signals, such as acknowledgement (ACK), data-valid, interrupt and error signals, using a differential signaling technique. Thus, the present invention transfers an "active" state on a multi-source/multi-sink control signal network by inverting the previous voltage level, and transfers an "inactive state" by maintaining the previous level. Thus, a change in the voltage level associated with a given control signal indicates that a given node on an SoC device is asserting the corresponding control signal. Likewise, the voltage level of the control signal from the current cycle will be maintained when there are no nodes driving the control signal.

In order to detect a change in the signal state from a current cycle, each node includes a memory element, such as a latch, for maintaining the previous state. In this manner, a voltage level from the next interval can be compared to the recorded state to detect a change of state indicating an assertion of the control signal by another node. Thus, a given control signal is asserted whenever the state of the signal at the end of the current cycle is different from the state of the signal at the end of the proceeding cycle. Likewise, in order to drive a given control signal, a node asserts the control signal by changing the state of the voltage signal. In one exemplary implementation, the asserted control signal is applied to an exclusive-OR gate together with the current value on the control signal wire to thereby cause a transition indicating an assertion of the control signal.

The present invention increases the signal transfer rate on a global signal wire that spans an SoC device by requiring only one voltage transition (e.g., from $V_{dd}$ to $V_{ss}$ or $V_{ss}$ to $V_{dd}$) to occur during each clock period. In addition, the present invention minimizes power dissipation by suppressing voltage transitions when the control signal is inactive A more complete understanding of the present invention, as well as further features and advantages of the present invention, will be obtained by reference to the following detailed description and drawings

DETAILED DESCRIPTION

Figure 1:
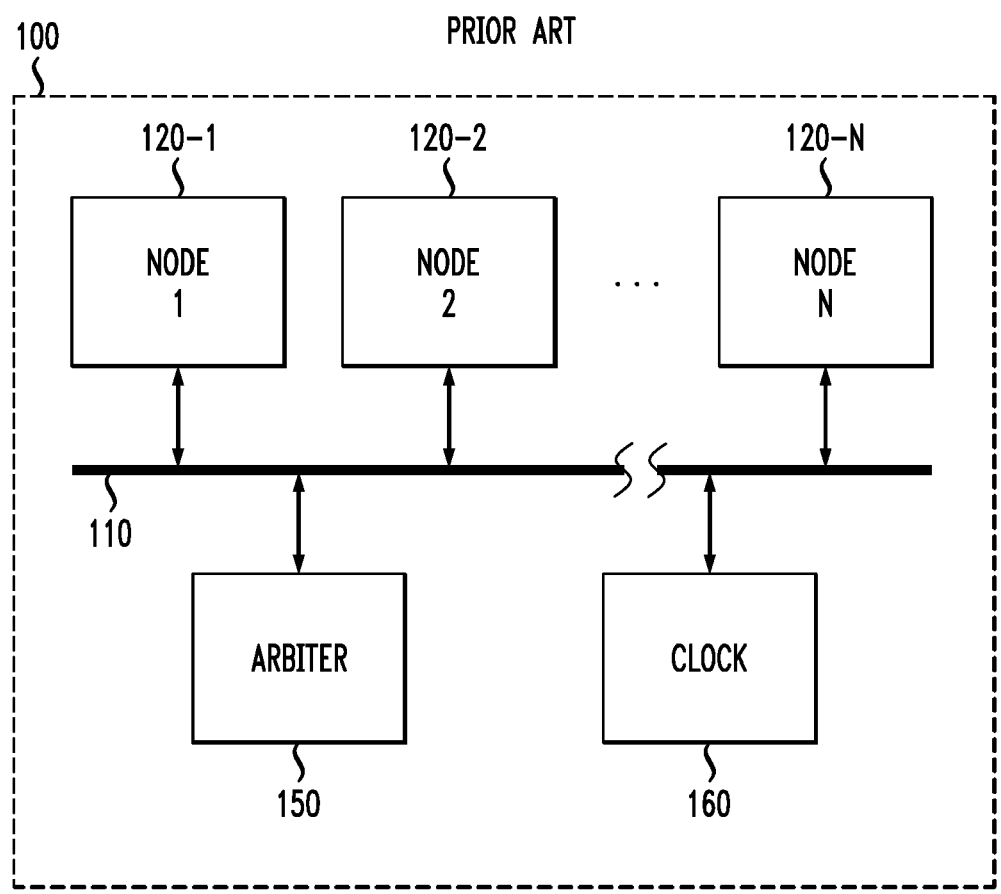
FIG. 1 is a schematic block diagram illustrating a conventional SoC where the present invention can operate.
Figure 2A:
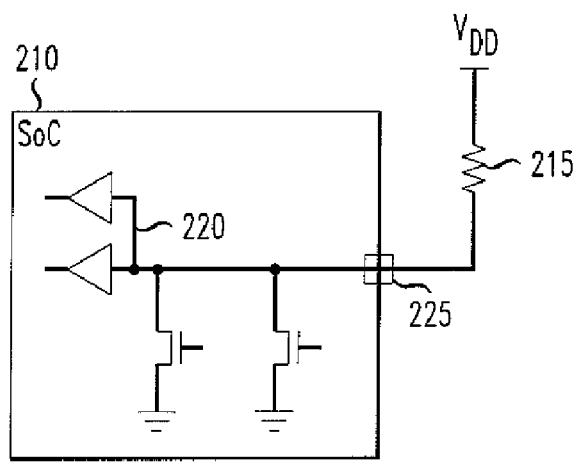
FIGS. 2A through 2C illustrate various implementations of conventional wired-OR networks for distributing multi-source/multi-sink control signals among various nodes on a chip.
Figure 2B:
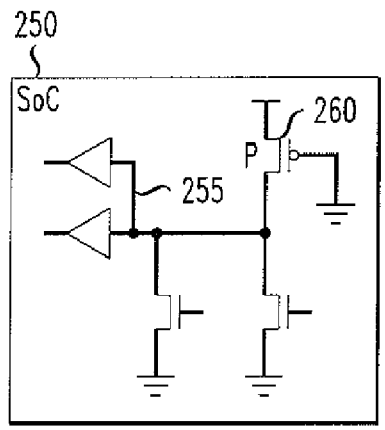
Figure 2C:
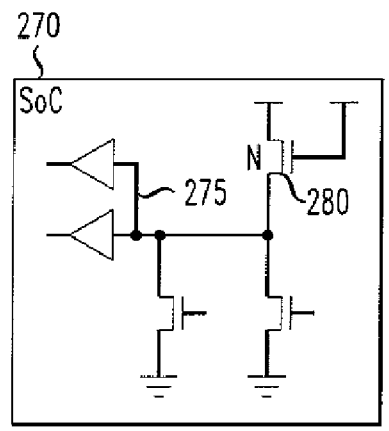
Figure 3:
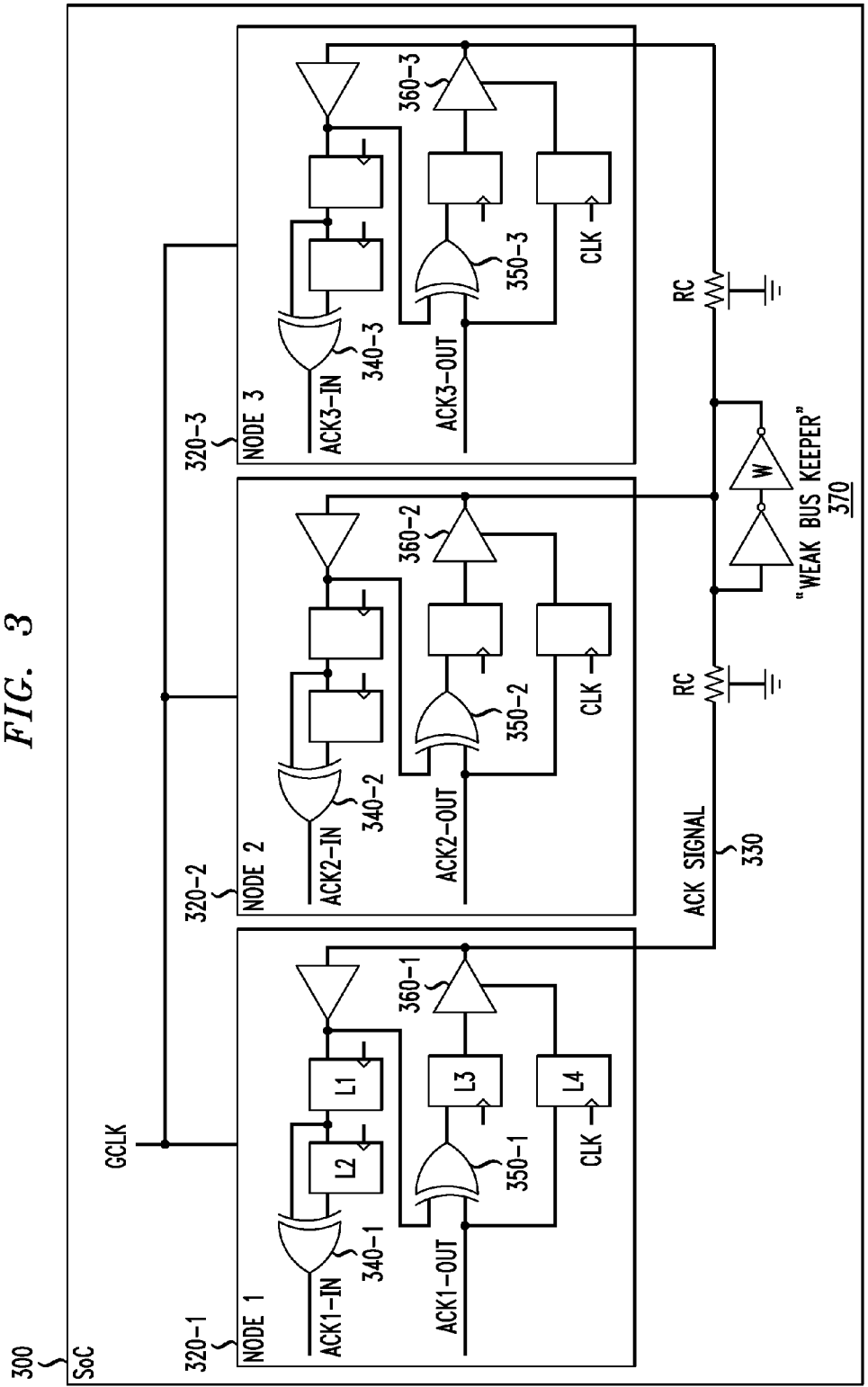
FIG. 3 is a schematic block diagram illustrating a multi-source/multi-sink control signal network of an SoC in accordance with the present invention.

FIG. 3 is a schematic block diagram of a control signal network in accordance with the present invention for distributing a multi-source/multi-sink control signal among various nodes 320-1 through 320-3, collectively referred to as nodes 320, on a chip 300. While the present invention is illustrated herein using the ACK control signal on a SoC chip, the present invention is applicable to any common line control signal that changes state to control communications on a common bus, such as data-valid, interrupt and error signals. As shown in the exemplary embodiment of FIG. 3, three exemplary nodes 320-1 through 320-3 are connected by a common ACK network 330 that signals successful completion of a data transaction on a shared bus (not shown). The wires that make up the interconnection network 330 have a significant RC component that is the limiting factor in the rate at which information may be transferred. In addition, there is a system requirement to transfer information from one of the connected nodes 320-$i$ to all of the other nodes 320 in one cycle. Typically, one node 320-$i$ is enabled to drive the control signal in any cycle and the control signal must be held in the same state for any cycle for which there is no enabled drives.

The common ACK network 330 signals successful completion of a data transaction. Generally, if data is being transferred from Node-1 to Node-3 in a given cycle, for example, then Node-3 must assert the ACK signal in a later cycle to inform Node-1 that the data was successfully received According to a feature of the present invention, discussed further below, the "active" state of a multi-source/multi-sink control signal is transferred by inverting the previous voltage level, and the "inactive state" is transferred by maintaining the previous level.

Figure 4:
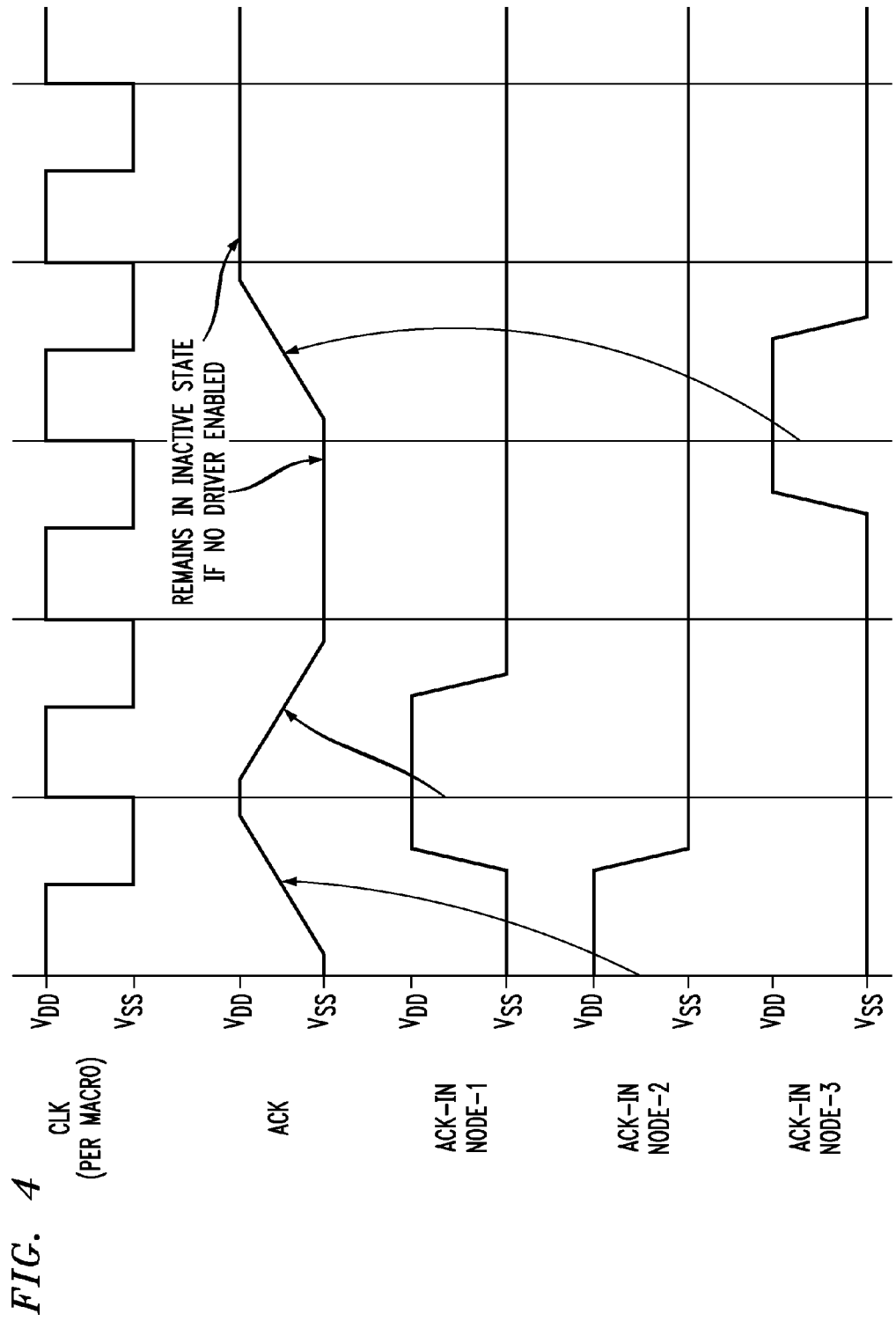
FIG. 4 illustrates the relative timing of various signals on the SoC chip shown in FIG. 3

A global clock (GCLK) is distributed to all nodes 320 and a clock tree is carefully balanced to ensure that all of the local clocks (CLKs) are closely aligned over the expected operating conditions (voltage, temperature, process variations) All inter-node transfers are initiated by the rising edge of the local clock (CLK). For a discussion of a suitable technique for maintaining clock alignment, see U.S. patent application Ser. No. 09/785,604 entitled "Method and Apparatus For Distributing a Self-Synchronized Clock to Nodes On a Chip," filed contemporaneously herewith, assigned to the assignee of the present invention and incorporated by reference herein FIG. 4 illustrates the relative timing of various signals on the chip 300. In the following discussion, FIGS. 3 and 4 will be discussed in an integrated manner to describe the operation and relative timing of the various components and corresponding signals on the chip 300. In the example of FIG. 4, node-2 is driving the ACK signal in the first cycle, node-1 is driving the ACK signal in the second cycle and node-3 is driving the ACK signal in the fourth cycle. Thus, since there are no nodes driving the ACK signal during the third and fifth cycles, the voltage level of the control signal from the previous cycle is maintained.

As shown in FIG. 3, each node 320 includes a pair of latches L1, L2 associated with a receive path (ACKi-IN), and a pair of latches L3, L4 associated with a send path (ACKi-OUT). With regard to the receive path, on each rising edge of the CLK signal, the previous state of the ACK network is latched into the receive latch (L1). At the same time, the previous value of the receive latch (L1) is transferred to the second latch (L2) The output values of these two latches are applied to an exclusive OR gate (XOR) 340-n to generate the ACKn-IN signal, where n is the node identifier. ACKn-IN will be asserted whenever the state of the ACK signal at the end of the current cycle is different from the state of the ACK signal at the end of the proceeding cycle. Hence, transitioning from a voltage level of $V_{DD}$ to $V_{SS}$, or $V_{SS}$ to $V_{DD}$ on the ACK wire occurring between two clock edges is interpreted to be an assertion of the ACK signal by another node 320-i. Conversely, no transition on the voltage levels is interpreted to be a deassertion of the ACK signal (or alternatively, the ACK is in an inactive state).

On the transmit path, a given node 320-i determines that it needs to drive an active signal onto the ACK line and in that case it asserts the ACKn-OUT signal. The ACKN-OUT signal is applied to an exclusive OR gate (XOR) 350-n with the current value on the ACK wire (to thereby cause a transition), which by design will be within the threshold of a logic-1 or logic-0 some setup time before the next clock edge. The resultant signal is latched (L3) on the rising edge of the clock signal, CLK The latched value will be the complement of the previous value if the node 320-i wishes to drive an active signal onto the ACK line. At the same time, the value on the ACKn-OUT signal is latched (L4) to generate the enable signal for the tri-state buffer 360-i that drives the complemented signal onto the ACK network 330.

In a point-to-point handshake application, only one node 320-i will drive the complemented value onto the ACK network 330, and all other nodes 320 will disable their tri-state buffers 360 However, there is no circuit conflict if two or more nodes attempt to drive the complemented value provided that no node attempts to drive the current value. Therefore, the invention also supports a broadcast type application where at least one receiver must respond with an active acknowledgement.

At power-up and after a system or node reset the states of the transmit and receive paths can become incompatible with the current state on the ACK signal. The system designer must therefore allow two CLK edges to occur before the tri-state buffer 360 can be enabled by latch L4. This ensures that the current state of the ACK signal has propagated to latches L1, L2 and L3.

When no node drives the ACK wire 330, a "weak bus keeper" device 370 is required to keep the signal value at the $V_{DD}$ or $V_{SS}$ level, and also to compensate for leakage and cross-coupling effects. It is noted that the slow transitions on the ACK signal (FIG. 4) are due to the high RC loading on the network 330, and that the transition time of the ACK signal is a limiting factor on the maximum performance of the SoC bus (not shown). However, only one transition is attempted in a cycle and the transition takes place over the entire cycle period This contributes to less active power and reduced cross-talk between adjacent control signals.

For example, assume during an initial cycle (i), that the ACK control signal has a value of one (1). During the next cycle (i+1), node A transmits data to node B, and node B successfully receives the data At the start of the next cycle (i+2), node B drives the ACK control signal to a value of zero (0), thereby changing state to signal acknowledgement, and node A now transmits data to node C, and node C successfully receives the data At the start of the next cycle (i+2), node C drives the ACK control signal to a value of one (1), thereby changing state to signal acknowledgement The present invention maximizes the signal transfer rate on a shared signal wire that spans an SoC device by allowing signal transitions to occur over the entire clock period. Global control wires with large RC loading components are the limiting factor in the performance of SoC bus schemes. The present invention overcomes RC effects on a global signal network 330 that spans an SoC device 300. The present invention takes advantage of the fact that the nodes 320 within the SoC 300 will use local clocks CLKs that have been de-skewed to a high tolerance. The present invention eliminates the need for passive pull-ups and pull-downs associated with pilot art techniques. In addition, the present invention minimizes power dissipation by eliminating redundant signal transitions. In other words, with the present invention it is no longer necessary to charge and discharge the control signal for every cycle.

It is to be understood that the embodiments and variations shown and described herein are merely illustrative of the principles of this invention and that various modifications may be implemented by those skilled in the art without departing from the scope and spirit of the invention

We claim:

1. A method for transmitting a control signal on a bus, said control signal having two signal states, said method comprising the steps of:
   assigning a first signal state to an adjustment of a voltage level of said control signal from a previous time interval;
   assigning a second signal state to maintaining said voltage level of said control signal from said previous time interval;
   adjusting said voltage level of said control signal from said previous time interval to indicate said first signal state, wherein said indication of said first or second signal state causes an action to be executed; and
   maintaining said voltage level of said control signal from the previous time interval to indicate said second signal state.

2. The method of claim 1, further comprising the step of maintaining said voltage level from the previous time interval using a memory element.

3. The method of claim 1, further comprising the step of ensuring that only a single node connected to said bus can assert said control signal in a given time interval.

4. The method of claim 1, wherein said bus is on a system-on-chip.

5. The method of claim 1, wherein said bus is on a printed circuit board.

6. The method of claim 1, wherein said adjusting step further comprises the step of transitioning from a first voltage level to a second voltage level.

7. The method of claim 1, wherein said adjusting step further comprises the step of applying a high logic level to an exclusive-OR gate with said voltage level from the previous time interval to determine the signal level to be asserted in the current time interval.

8. A method for receiving a control signal on a bus, said control signal having two signal states, said method comprising the steps of:
   detecting a voltage level of said control signal;
   interpreting said control signal as indicating a first signal state if said voltage level has been substantially adjusted from a previous time interval, wherein said indication of said first or second signal state causes an action to be executed; and
   interpreting said control signal as indicating a second signal state if said voltage level has been substantially maintained from a previous time interval.

9. The method of claim 8, further comprising the step of maintaining said control signal value at said voltage level from said previous time interval when no node drives said bus.

10. The method of claim 9, further comprising the step of compensating for leakage and cross-coupling effects.

11. The method of claim 8, further comprising the step of maintaining said voltage level from the previous time interval using a memory element.

12. The method of claim 8, wherein said bus is on a system-on-chip.

13. The method of claim 8, wherein said bus is on a printed circuit board.

14. The method of claim 8, wherein said adjusted voltage level is a transitioning from a first voltage level to a second voltage level.

15. The method of claim 8, wherein said first detecting step further comprises the step of applying said received control signal state to an exclusive-OR gate with said voltage level from the previous time interval to determine the signal level to be asserted in the current time interval.

16. A device for communicating a control signal on a bus, said control signal having two signal states, said device comprising:
   a memory element for maintaining a voltage level from a previous time interval;
   a comparison circuit for detecting a change in said voltage level from the previous time interval of said control signal by another device and for interpreting said control signal, wherein an adjustment of said control signal from the previous time interval is interpreted as a first signal state, wherein maintaining said control signal from the previous time interval is interpreted as a second signal state, and wherein said indication of said first or second signal state causes an action to be executed; and
   an adjustment circuit for changing said voltage level from the previous time interval indicating an assertion of said control signal by another device.

17. The device of claim 16, wherein said memory element is a latch.

18. The device of claim 16, further comprising a circuit that ensures that only a single device connected to said bus can assert said control signal in a given time interval.

19. The device of claim 16, wherein said bus is on a system-on-chip.

20. The device of claim 16, wherein said bus is on a printed circuit board.

21. The device of claim 16, wherein said change in said voltage level from the previous time interval is a change from a first voltage level to a second voltage level.

22. The device of claim 16, wherein said adjustment circuit is an exclusive-OR gate.

23. The device of claim 16, wherein said comparison circuit is an exclusive-OR gate.

* * * * *

UNITED STATES PATENT AND TRADEMARK OFFICE
CERTIFICATE OF CORRECTION

| | | |
|---|---|---|
| PATENT NO. | : 7,383,455 B2 | Page 1 of 1 |
| APPLICATION NO. | : 11/620787 | |
| DATED | : June 3, 2008 | |
| INVENTOR(S) | : John Susantha Fernando | |

It is certified that error appears in the above-identified patent and that said Letters Patent is hereby corrected as shown below:

In claim 17, column 8, line 20, "Ihe" should be replaced by -- The --.

Signed and Sealed this
Twenty-fifth Day of December, 2012

David J. Kappos
*Director of the United States Patent and Trademark Office*